United States Patent
Pashley

(10) Patent No.: US 7,849,732 B2
(45) Date of Patent: Dec. 14, 2010

(54) CONTROLLING FUEL SUPPLY TO A COMBUSTOR OF A GAS TURBINE ENGINE

(75) Inventor: Nicholas C Pashley, Bristol (GB)

(73) Assignee: Rolls-Royce PLC, London (GB)

( * ) Notice: Subject to any disclaimer, the term of this patent is extended or adjusted under 35 U.S.C. 154(b) by 829 days.

(21) Appl. No.: 11/822,510

(22) Filed: Jul. 6, 2007

(65) Prior Publication Data

US 2008/0034731 A1 Feb. 14, 2008

(30) Foreign Application Priority Data

Aug. 10, 2006 (GB) .................. 0616003.0

(51) Int. Cl.
*G01M 15/14* (2006.01)
(52) U.S. Cl. .................. 73/112.01
(58) Field of Classification Search ............. 73/112.01, 73/112.03, 112.05
See application file for complete search history.

(56) References Cited

U.S. PATENT DOCUMENTS 5,596,871 A 1/1997 Lenertz

FOREIGN PATENT DOCUMENTS

| GB | 2 397 395 A | 7/2004 |
|---|---|---|
| JP | A 03-249337 | 11/1991 |

*Primary Examiner*—Eric S McCall
(74) *Attorney, Agent, or Firm*—Oliff & Berridge, PLC

(57) ABSTRACT

The minimum fuel flow to a combustor of a gas turbine engine is limited in response to the engine inlet temperature $T_1$ and x, an exponent dependent on engine configuration and engine entry pressure $P_1$, in order to provide a fuel air ratio (FAR) limit which responds to both factors. This enables the fuel flow to be limited such that the FAR is set to avoid unintentionally extinguishing the combustor flame and the rate of deceleration is maximised, regardless of ambient temperature and engine altitude.

7 Claims, 1 Drawing Sheet

CONTROLLING FUEL SUPPLY TO A COMBUSTOR OF A GAS TURBINE ENGINE

BACKGROUND

This invention relates to control of a fuel supply to a combustor of a gas turbine engine.

Under some conditions, the flame in a gas turbine engine combustor may be extinguished unintentionally. This is known as flame out. The present invention addresses the problem of flame out occurring when fuel flow is reduced to decelerate an engine rapidly from a high power setting to idle.

Engine deceleration is achieved by reducing the flow of fuel to the combustors of the engine and, if the fuel flow reduction is not carefully controlled, the fuel air ratio (FAR) may fall to a level at which the flame can no longer sustain itself and is extinguished. However, a high rate of engine deceleration and consequent thrust loss is desirable in many situations, for example during combat. As a result the control system must set minimum fuel flow according to a trade off between maximising the rate of deceleration and minimising the risk of flame out.

In practice, a stability margin is set to minimise the possibility of flame out. That stability margin takes account of the FAR weak extinction threshold but also includes factors which take account of control logic sensitivity to ambient temperature, differences between engine builds, control system tolerances and other such possible errors. The stable control of an engine requires the supply of fuel to be limited to keep the FAR below the stability margin.

It is known to base the fuel flow rate to a gas turbine engine combustor on, inter alia, the square root of non-dimensional engine entry temperature (theta). Theta is the result of a division of the engine inlet temperature ($T_1$) by the international standard atmospheric temperature ($T_{ISA}$). While using the square root of theta can ensure that engine operation is controlled as close as possible to a fixed stability margin that maximises the rate of deceleration for one fixed ambient temperature, this method exhibits sensitivity to ambient temperature. The result is that during cold days, the rate of deceleration may be limited more than necessary to account for a higher likelihood of flame out with the same engine conditions during a hot day. The present invention aims to eliminate the need for additional FAR margin to be used to accommodate changes in ambient temperature by using a FAR calculation that is insensitive to ambient temperature.

SUMMARY

According to the present invention there is provided a method of limiting the minimum fuel flow to a combustor of a gas turbine engine, the method comprising:
(a) deriving from a first set of operating parameters of the engine, a first derived value which represents the minimum fuel flow requirement of the combustor multiplied by a factor, which factor includes the engine inlet temperature and an exponent dependent on engine configuration and engine entry pressure;
(b) measuring the engine inlet temperature and engine inlet pressure and deriving therefrom the factor;
(c) dividing the first derived value by the factor to generate a second derived value; and
(d) multiplying the second derived value by the combustor inlet pressure to generate the minimum fuel flow requirement.

Preferably the factor is of the form $$\left(\frac{T_1}{T_{ISA}}\right)^x$$

Where $T_1$ is the engine inlet temperature, $T_{ISA}$ is the international standard atmospheric temperature (288.15K), and x is the exponent dependent on engine configuration and engine entry pressure.

According to another aspect of the present invention, there is provided a control system for limiting the minimum fuel flow to the combustor of a gas turbine engine according to the previously described method, the control system comprising:
(a) a processor unit adapted to derive, from a first set of operating parameters of the engine, a first derived value which represents the minimum fuel flow requirement of the combustor multiplied by a factor, which factor includes the engine inlet temperature and an exponent dependent on engine configuration and engine inlet pressure;
(b) means for measuring engine inlet temperature and engine inlet pressure and means to derive therefrom the factor;
(c) a divider for dividing the first derived value by the factor to generate a second derived value; and
(d) a multiplier for generating the minimum fuel flow requirement from the second derived value.

BRIEF DESCRIPTION OF THE DRAWINGS

For a better understanding of the present invention, and to show how it may be carried into effect, reference will now be made, by way of example, to the accompanying drawings, in which.

Figure 1:
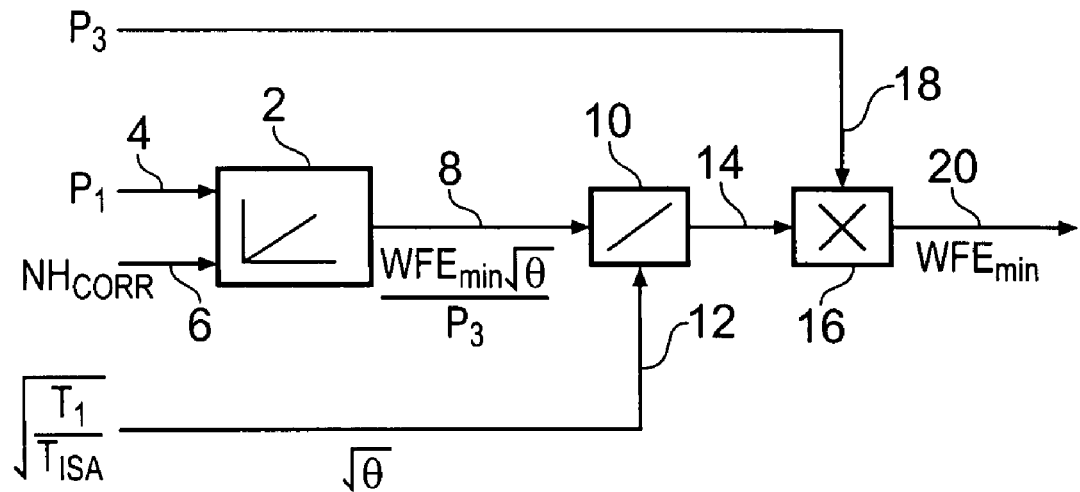
FIG. 1 is a diagrammatic representation of a known control system for limiting the fuel flow to a gas turbine engine combustor.

In a gas turbine engine is a fuel control system of FIG. 1 that limits fuel flow to the combustor according to minimum fuel flow requirement signal 20.

DETAILED DESCRIPTION OF EMBODIMENTS

Referring to FIG. 1, the fuel control system comprises a processor device 2 serving as a look-up table. The device 2 receives a first input 4 representing the engine input pressure $P_1$ and a second input 6 representing a corrected HP spool speed $NH_{CORR}$, where:

$$NH_{CORR} = \frac{NH}{\sqrt{\theta}}$$

and $$\theta = \frac{T_1}{T_{ISA}}$$

The inputs 4 and 6 represent in the device 2 a particular address containing a unique value representing the function $$\frac{WFE_{min} \cdot \left(\frac{T_1}{T_{ISA}}\right)^{\frac{1}{2}}}{P3}$$

The signal representing this value is output on line 8 to a divider 10.

The divider 10 has a second input 12 through which the divider 10 receives a signal representing $$\sqrt{\theta}$$

where $$\theta = \frac{T_1}{T_{ISA}}$$

wherein $T_1$ is the engine inlet temperature and $T_{ISA}$ is the international standard atmospheric temperature of 288.15K. It will be appreciated that, by dividing the input on line 8 by the input on line 12, the output from the divider on line 14 is $$\frac{WFE_{min}}{P3}$$

A signal representing this value is input on line 14 to a multiplier 16, which also receives a signal on line 18 representing the combustor inlet pressure $P_3$. Multiplying the inputs on lines 14 and 18 provides an output on line 20 equal to $WFE_{min}$, the calculated minimum fuel flow requirement.

Figure 2:
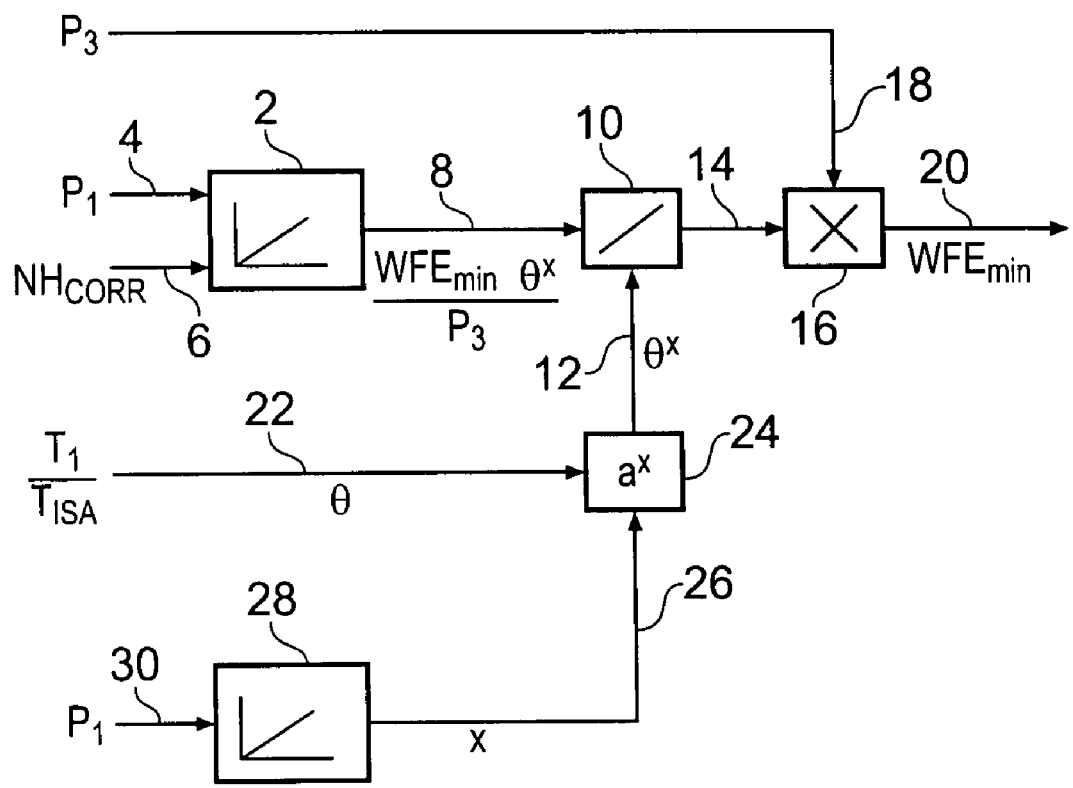
FIG. 2 is a diagrammatic representation of a gas turbine engine combustor fuel control system for limiting the fuel flow in accordance with the present invention.

The apparatus of the present invention is represented in FIG. 2. In this apparatus, components corresponding to those of FIG. 1 are represented by the same reference numbers.

In the apparatus of FIG. 2, the processing device 2 outputs on line 8 a signal representing the value of a function:

$$\frac{WFE_{min} \cdot \left(\frac{T_1}{T_{ISA}}\right)^x}{P3}$$

It will be appreciated that, in this function x has been substituted for the value of a half in FIG. 1. Consequently, the output on line 8 represents the minimum fuel flow requirement $WFE_{min}$ multiplied by a factor $$\left(\frac{T_1}{T_{ISA}}\right)^x$$

which includes x, and divided by the combustor inlet pressure $P_3$. This value is input as the numerator of the divider 10.

A signal representing the value of $$\frac{T_1}{T_{ISA}}$$

is input on line 22 to an exponentiator 24, which also receives an input on line 26 representing x, an exponent dependent on engine configuration and engine entry pressure.

A processor device 28, serving as a look up table, receives an input 30 representing the engine intake pressure $P_1$. Input 30 represents in the device 28 a particular address containing a unique value of x, which is output on line 26, to the exponentiator 24. The inputs 22 and 26 to the exponentiator are received as the base and exponent respectively, a signal representing the factor is output on line 12 as the denominator of the divider 10.

Thus, the output on line 14 represents a second derived value which is operated upon by the multiplier 16, as in the apparatus of FIG. 1, to produce a signal on line 20 representing the minimum fuel flow requirement.

Substituting the exponent x for the fixed value of a half in the minimum fuel limiter calculation enables the engine control system to increase deceleration performance according to ambient temperature, approximated by $T_1$. This enables the control system to mimic the performance of the apparatus of FIG. 1 to demand the most rapid rate of deceleration possible when $T_1$ is highest, and without risking flame out, continue to demand that rate for all other values of $T_1$. As the minimum fuel flow limit may be set to demand the highest rate of deceleration that keeps the FAR below the stability margin for all ambient temperatures, it is thus insensitive to changes in ambient temperature.

The known apparatus of FIG. 1 prevents flame out by controlling the FAR according to the worst case scenario of a hot engine inlet temperature. The present invention tailors the minimum allowable FAR to current environmental conditions by performing its minimum fuel flow calculations using a value for x. The value of x required to make the minimum fuel limiter calculation insensitive to changes in ambient temperature may vary with altitude and so x is derived directly from the current value of engine inlet pressure $P_1$. The fuel control system of the invention uses an empirically formed look-up table to map each value of $P_1$ to a unique value of x that is used to determine the minimum fuel flow limit. By virtue of this, the minimum fuel flow limit can remain insensitive to changes in ambient temperature at all altitudes by compensating for changes in $P_1$.

The invention claimed is:

1. A method of limiting a minimum fuel flow to a combustor of a gas turbine engine comprising:
   (a) deriving a first derived value from a first set of operating parameters of the engine;
   (b) measuring engine inlet temperature and engine inlet pressure, and deriving therefrom a factor comprising the engine inlet temperature and an exponent dependent on engine configuration and engine inlet pressure;
   (c) dividing the first derived value by the factor to generate a second derived value;
   (d) multiplying the second derived value by combustor inlet pressure to generate a minimum fuel flow requirement; and
   (e) limiting the minimum fuel flow to the combustor according to the minimum fuel flow requirement.

2. The method as claimed in claim 1, in which the factor by which the first derived value is divided is $$\left(\frac{T_1}{T_{ISA}}\right)^x$$

wherein $T_1$ is the engine inlet temperature, $T_{ISA}$ is an international standard atmospheric temperature (288.15K), and x is the exponent dependent on engine configuration and engine inlet pressure.

3. The method as claimed in claim 1, wherein the first derived value is $$\frac{WFE_{min} \cdot \left(\frac{T_1}{T_{ISA}}\right)^x}{P3}$$

wherein $WFE_{min}$ is a calculated minimum fuel flow requirement, $T_1$ is the engine inlet temperature, $T_{ISA}$ is the international standard atmospheric temperature, x is the exponent dependent on engine configuration and engine inlet pressure, and $P_3$ is the combustor inlet pressure.

4. A control system for carrying out the method of claim 1 for limiting the minimum fuel flow requirement to the combustor of the gas turbine engine, the control system comprising:
   (a) a processor unit adapted to derive the first derived value from the first set of operating parameters of the engine; engine inlet pressure;
   (b) an apparatus that measures the engine inlet temperature and the engine inlet pressure and means to derive therefrom a factor comprising the engine inlet temperature and the exponent dependent on engine configuration and engine inlet pressure;
   (c) a divider for dividing the first derived value by the factor to generate the second derived value;
   (d) a multiplier for generating the minimum fuel flow requirement from the second derived value; and
   (e) an apparatus for limiting the minimum fuel flow to the combustor according to the minimum fuel flow requirement.

5. The control system as claimed in claim 4, in which the processor unit adapted to derive the first derived value, further comprises a look-up table.

6. The control system as claimed in claim 4, in which the processor unit adapted to derive the factor, further comprises a processing unit with look-up table to derive, from the engine inlet pressure, the exponent dependent on engine configuration and engine inlet pressure.

7. The control system as claimed in claim 4, wherein the control system is part of a gas turbine engine.

* * * * *